US010896366B2

(12) United States Patent
Sozubek et al.

(10) Patent No.: US 10,896,366 B2
(45) Date of Patent: Jan. 19, 2021

(54) REDUCTION OF PARAMETERS IN FULLY CONNECTED LAYERS OF NEURAL NETWORKS BY LOW RANK FACTORIZATIONS (71) Applicant: Huawei Technologies Co., Ltd., Shenzhen (CN)

(72) Inventors: Serdar Sozubek, North York (CA); Barnaby Dalton, Mississauga (CA); Vanessa Courville, Markham (CA); Graham Taylor, Guelph (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 935 days.

(21) Appl. No.: 15/453,641

(22) Filed: Mar. 8, 2017

(65) Prior Publication Data

US 2017/0337465 A1 Nov. 23, 2017

Related U.S. Application Data (63) Continuation-in-part of application No. 15/258,691, filed on Sep. 7, 2016, now Pat. No. 10,509,996.
(Continued)

(51) Int. Cl.
*G06N 3/04* (2006.01)
*G06F 17/16* (2006.01)
*G06N 3/08* (2006.01)

(52) U.S. Cl.
CPC .............. *G06N 3/04* (2013.01); *G06F 17/16* (2013.01); *G06N 3/08* (2013.01)

(58) Field of Classification Search
None
See application file for complete search history.

(56) References Cited

U.S. PATENT DOCUMENTS 6,587,845 B1   7/2003  Braunheim
9,189,458 B1   11/2015 Langer et al.
(Continued)

FOREIGN PATENT DOCUMENTS

CN   103023840 A   4/2013
CN   105184362 A   12/2015

OTHER PUBLICATIONS

Hwang, Kai, and Yeng-Heng Cheng. "Partitioned matrix algorithms for VLSI arithmetic systems." IEEE Transactions on Computers 100.12 (1982): 1215-1224. (Year: 1982).*
(Continued)

*Primary Examiner* — Hal Schnee
(74) *Attorney, Agent, or Firm* — Slater Matsil, LLP (57) ABSTRACT The present disclosure is drawn to the reduction of parameters in fully connected layers of neural networks. For a layer whose output is defined by y=Wx, where y∈R$^m$ is the output vector, x∈R$^n$ is the input vector, and W∈R$^{m\times n}$ is a matrix of connection parameters, matrices $U_{ij}$ and $V_{ij}$ are defined and submatrices $W_{ij}$ are computed as the product of $U_{ij}$ and $V_{ij}$, so that $W_{ij}=V_{ij}U_{ij}$, and W is obtained by appending submatrices $W_{i,j}$.

18 Claims, 6 Drawing Sheets

Related U.S. Application Data (60) Provisional application No. 62/337,566, filed on May 17, 2016.

(56) References Cited

U.S. PATENT DOCUMENTS

2016/0098633 A1    4/2016  Min
2016/0217367 A1*   7/2016  Moreno .................. G10L 15/16
2018/0018554 A1*   1/2018  Young ..................... G06N 3/063

OTHER PUBLICATIONS

C.F. Van Loan et al., "Approximation With Kronecker Products," Linear Algebra/ar Large Seale and Real-Time Applieatians, 293-314. 1993 Kluwer Aeademie Publishers. (Year: 1993). Total 22 pages.

Alexander Novikov et al. "Tensorizing Neural Networks," arXiv:1509.06569v2, Submitted on Sep. 22, 2015 (v1), last revised Dec. 20, 2015 (this version, v2) (Year: 2015). Total 9 pages.

* cited by examiner

FIGURE 5 ured using matrices as $y=W \cdot x$, where $W$ is an $m \times n$ matrix. When

REDUCTION OF PARAMETERS IN FULLY CONNECTED LAYERS OF NEURAL NETWORKS BY LOW RANK FACTORIZATIONS

CROSS-REFERENCE TO RELATED APPLICATIONS

The present application claims the benefit of U.S. Provisional Patent Application No. 62/337,566 filed on May 17, 2016, the contents of which are hereby incorporated by reference. The present application is also a continuation-in-part of U.S. patent application Ser. No. 15/258,691 filed on Sep. 7, 2016, which claims the benefit of U.S. Provisional Patent Application No. 62/337,566 filed on May 17, 2016, the contents of which are hereby incorporated by reference.

TECHNICAL FIELD

The present disclosure relates to creating layers for neural networks and particularly, to creating fully connected layers.

BACKGROUND OF THE ART

Artificial neural networks are connectionist systems inspired by biological neural networks. They are used to approximate functions that can depend on a large number of unknown inputs. Neural networks are generally presented as systems of interconnected "neurons" (or nodes) which exchange messages between each other. The connections (or edges) between the neurons may have numeric weights associated with them that can be tuned using various optimization methods, for example stochastic gradient descent.

A deep neural network is made up of many layers. A layer, for example, may have n inputs $(x_1, x_2, \ldots, x_n)$ and m outputs $(y_1, y_2, \ldots, y_m)$. The number of inputs may be different from the number of outputs, and may also be different for different layers. Each layer connects the inputs nodes to the outputs nodes, in a way that is specific to the type of layer. The outputs from one layer may be the inputs to the next layer.

One type of layer found in neural networks is a fully connected layer. In a fully connected layer, each input node is connected to each output node, such that $y_i = w_{i,1} * x_1 + w_{i,2} * x_2 + \ldots + w_{i,n} * x_n$. This may also be represented using matrices as $y = W \cdot x$, where $W$ is an $m \times n$ matrix. When implementing the neural network on a computer, $n \times m$ parameters are loaded from memory and $n \times m$ computations are performed. Some of the larger layers of neural networks have up to n=9216 and m=4096. With 32-bit weights, this requires 150 MB for each iteration. Memory bandwidth is expensive in embedded device implementations.

Therefore, there is a need for improvement.

SUMMARY

The present disclosure is drawn to the reduction of parameters in fully connected layers of neural networks. For a layer whose output is defined by $y=Wx$, where $y \in R^m$ is the output vector, $x \in R^n$ is the input vector, and $W \in R^{m \times n}$ is a matrix of connection parameters, matrices $U_{ij}$ and $V_{ij}$ are defined and submatrices $W_{ij}$ are computed as the product of $U_{ij}$ and $V_{ij}$, so that $W_{ij} = V_{ij} U_{ij}$, and $W$ is obtained by appending submatrices $W_{i,j}$.

In accordance with a first broad aspect, there is provided a method for creating a neural network layer. The method comprises partitioning an m-dimensional output vector y into equally sized subvectors $y_i$ of length s and an n-dimensional input vector x into equally sized subvectors $x_j$ of length t, where s is a divisor of m and t is a divisor of n. Matrices $U_{ij} \in R^{r \times t}$ and $V_{ij} \in R^{s \times r}$ of rank r are defined for $i=(1, \ldots, m/s)$ and $j=(1, \ldots, n/t)$, where $r \le \min(s, t)$. A plurality of submatrices $W_{ij}$ are computed as a product of matrices $U_{ij}$ and matrices $V_{ij}$, and the output vector y is determined from $y=W \cdot x$, where W is a matrix composed of the plurality of submatrices $W_{ij}$ for $i=(1, \ldots, m/s)$ and $j=(1, \ldots, n/t)$.

In some embodiments, determining the output vector y from $y=W \cdot x$ comprises computing $y_i = \sum_{j=1}^{n/t}(W_{ij} x_j)$ and determining the output vector y as $y=[y_1, y_2, y_3, \ldots, y_{m/s}]$.

In some embodiments, determining the output vector y from $y=W \cdot x$ comprises appending submatrices $W_{ij}$ to obtain matrix W, and computing $y=W \cdot x$.

In some embodiments, the method further comprises storing the matrices $V_{ij}$ and $U_{ij}$.

In some embodiments, the method further comprises retrieving the stored matrices $V_{ij}$ and $U_{ij}$ to compute the submatrices $W_{i,j}$.

In some embodiments, the neural network is a feedforward neural network and/or a deep neural network.

In some embodiments, defining matrices $V_{ij}$ and $U_{ij}$ is performed during a training phase of the neural network.

In accordance with another broad aspect, there is provided a system for creating a neural network layer. The system comprises a processing unit and a non-transitory memory communicatively coupled to the processing unit and comprising computer-readable program instructions. The program instructions are executable by the processing unit for defining an n-dimensional input vector x and an m-dimensional output vector y, selecting a divisor s of m and a divisor t of n, and partitioning the output vector y into equally sized subvectors $y_i$ of length s and partitioning the input vector x into equally sized subvectors $x_j$ of length t. The program instructions are executable by the processing unit for defining $U_{ij} \in R^{r \times t}$ of rank r and matrices $V_{ij} \in R^{s \times r}$ of rank r for $i=(1, \ldots, m/s)$ and $j=(1, \ldots, n/t)$, where $r \le \min(s, t)$, computing submatrices $W_{ij}$ as a product of matrices $U_{ij}$ and matrices $V_{ij}$, and determining the output vector y from $y=W \cdot x$, where W is a matrix composed of all submatrices $W_{ij}$ for $i=(1, \ldots, m/s)$ and $j=(1 \ldots, n/t)$.

In some embodiments, defining matrices $V_{ij}$ and $U_{ij}$ is performed during a training phase of the neural network.

In accordance with yet another broad aspect, there is provided a method for implementing a neural network layer. The method comprises receiving an n-dimensional input vector x, retrieving from memory matrices $U_{ij} \in R^{r \times t}$ of rank r and matrices $V_{ij} \in R^{s \times r}$ of rank r, and partitioning the input vector x into equally sized subvectors $x_j$ of length t. The method then comprises computing submatrices $W_{ij}$ as a product of matrices $U_{ij}$ and matrices $V_{ij}$ and determining the output vector y from $y=W \cdot x$, where W is a matrix composed of all submatrices $W_{ij}$ for $i=(1, \ldots, m/s)$ and $j=(1, \ldots, n/t)$, where t is a divisor of n, s is a divisor of m, and $r \le \min(s, t)$.

In some embodiments, determining the output vector y from $y=W \cdot x$ comprises computing $y_i = \sum_{j=1}^{n/t}(W_{ij} x_j)$ and determining the output vector y as $y=[y_1, y_2, y_3, \ldots, y_{m/s}]$.

In some embodiments, determining the output vector y from $y=W \cdot x$ comprises appending submatrices $W_{ij}$ to obtain matrix W and computing $y=W \cdot x$.

In some embodiments, the neural network is a feedforward neural network and/or a deep neural network.

In accordance with another broad aspect, there is provided a system for implementing a neural network layer. The system comprises a processing unit and a non-transitory memory communicatively coupled to the processing unit and comprising computer-readable program instructions. The program instructions are executable by the processing unit for receiving an n-dimensional input vector x, retrieving from memory matrices $U_{ij} \in R^{r \times t}$ of rank r and matrices $V_{ij} \in R^{s \times r}$ of rank r, and partitioning the input vector x into equally sized subvectors $x_j$ of length t. The program instructions are then executable for computing submatrices $W_{ij}$ as a product of matrices $U_{ij}$ and matrices $V_{ij}$ and determining the output vector y from y=W·x, where W is a matrix composed of all submatrices $W_{ij}$ for i=(1, . . . , m/s) and j=(1, . . . , n/t), where t is a divisor of n, s is a divisor of m, and r≤min(s, t).

In some embodiments, determining the output vector y from y=W·x comprises computing $y_i = \Sigma_{j=1}^{n/t}(W_{ij}x_j)$ and determining the output vector y as $y=[y_1, y_2, y_3, \ldots, y_{m/s}]$.

In some embodiments, determining the output vector y from y=W·x comprises appending submatrices $W_{ij}$ to obtain matrix W and computing y=W·x.

In some embodiments, the neural network is a feedforward neural network and/or a deep neural network.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
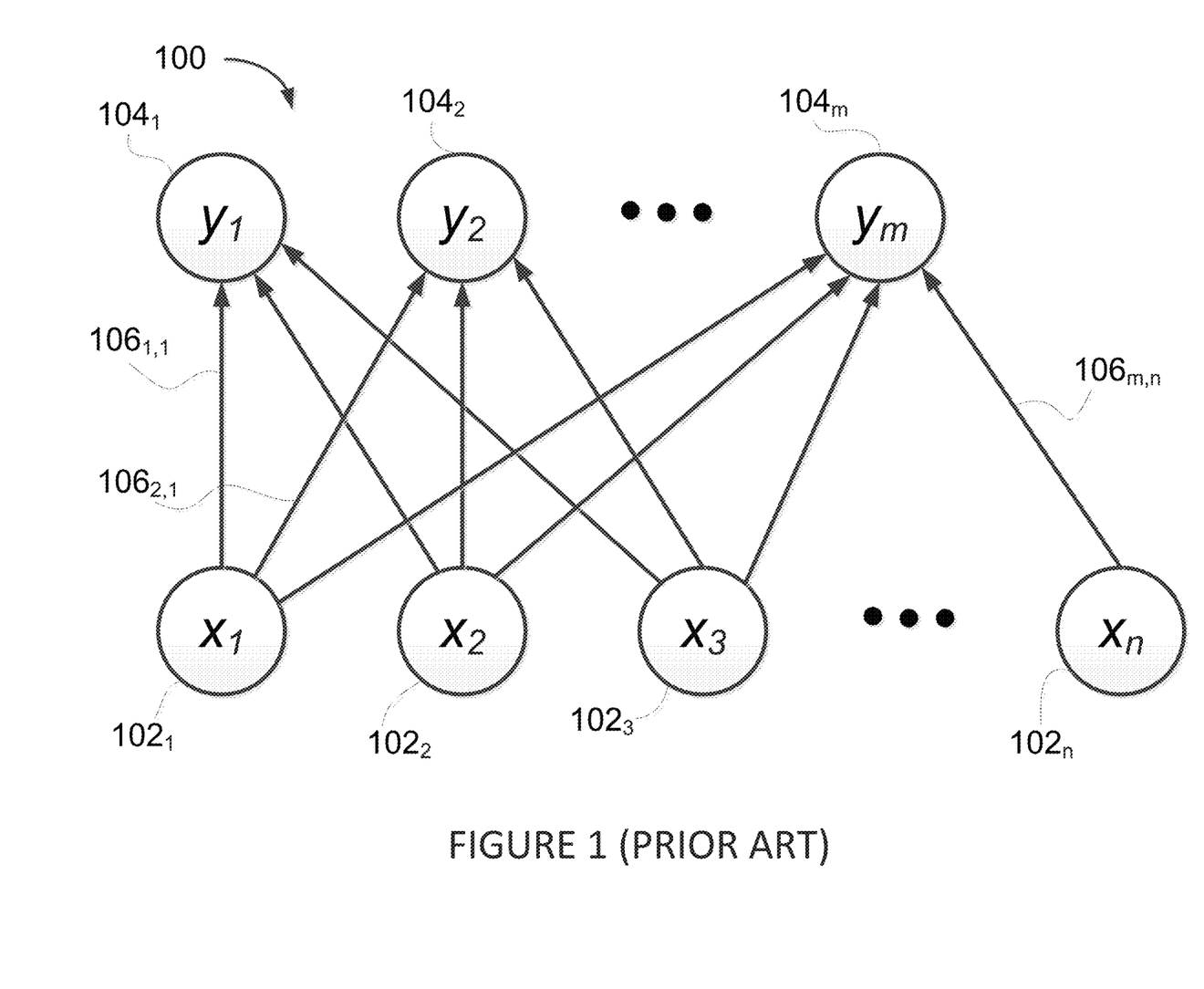
FIG. 1 is a graphical illustration of a fully connected layer of a neural network, as per the prior art.

Referring to FIG. 1, there is illustrated a fully connected layer 100 of a neural network (not shown), as per the prior art. In this example, n inputs $102_1, 102_2, 102_3 \ldots 102_n$ are connected to m outputs $104_1, 104_2, \ldots 104_m$. More specifically, each input $102_1, 102_2, 102_3 \ldots 102_n$ is connected to each output $104_1, 104_2, \ldots 104_m$ via a direct connection $106_{1,1}, 106_{2,1}, \ldots 106_{m,n}$. Each connection $106_{1,1}, 106_{2,1}, \ldots 106_{m,n}$ corresponds to a parameter used to attenuate or amplify a signal going from the inputs $102_1, 102_2, 102_3 \ldots 102_n$ to the outputs $104_1, 104_2, \ldots 104_m$ and/or to reverse a sign of the signal.

The n inputs $102_1, 102_2, 102_3 \ldots 102_n$ are represented mathematically as an n-dimensional input vector x. The m outputs $104_1, 104_2, \ldots 104_n$ are represented mathematically as an m-dimensional output vector y. The connections $106_{1,1}, 106_{2,1}, \ldots 106_{m,n}$ correspond to a matrix W such that the output vector y is given by:

$$y = W \cdot x \quad (1)$$

The input vector x may be partitioned into equally sized subvectors $x_j$ of length t, where t is a divisor of n. Similarly, the output vector y may be partitioned into equally sized subvectors $y_i$ of length s, where s is a divisor of m:

$$y = [y_1, y_2, y_3, \ldots, y_{m/s}] \quad (2)$$

$$x = [x_1, x_2, x_3, \ldots, x_{n/t}] \quad (3)$$

Vectors x and y may thus be obtained by concatenation of all $x_j$ and all $y_i$ subvectors, respectively. The matrix W is partitioned into equally sized s×t dimensional submatrices $W_{ij}$:

$$W = \begin{bmatrix} W_{1,1} & W_{1,2} & \ldots & W_{1,j} & \ldots & W_{1,\frac{n}{t}} \\ W_{2,1} & W_{2,2} & \ldots & W_{2,j} & \ldots & W_{2,\frac{n}{t}} \\ \ldots & \ldots & \ldots & \ldots & \ldots & \ldots \\ W_{i,1} & W_{i,2} & \ldots & W_{i,j} & \ldots & W_{i,\frac{n}{t}} \\ \ldots & \ldots & \ldots & \ldots & \ldots & \ldots \\ W_{\frac{m}{s},1} & W_{\frac{m}{s},2} & \ldots & W_{\frac{m}{s},j} & \ldots & W_{\frac{m}{s},\frac{n}{t}} \end{bmatrix}$$

Each submatrix $W_{ij}$ connects the jth group of input nodes to the ith group of output nodes. The ith subvector $y_i$ of the output vector y may then be represented as:

$$y_i = \Sigma_{j=1}^{n/t} W_{i,j} \cdot x_j \quad (4)$$

Performing this computation for all i∈{1,2, . . . , m/s}, the entire output vector y is computed.

In order to reduce the number of parameters needed for the computation of the output vector y, each submatrix $W_{i,j}$ is represented as a product of at least two sets of matrices of rank r. The first matrices are $V_{ij} \in R^{s \times r}$ and the second matrices are $U_{ij} \in R^{r \times t}$, for all i∈{1,2, . . . , n/t} and j∈{1,2, . . . , m/s}, so that:

$$W_{i,j} = V_{ij}U_{ij} \quad (5)$$

Note that parameters for divisors s of m and t of n and rank r are selected such that r≤min(s, t).

Replacing equation (5) into equation (4), the $i^{th}$ subvector $y_i$ of the output vector y becomes (for i∈{1,2, . . . , m/s}):

$$y_i = \Sigma_{j=1}^{n/t}(V_{ij}U_{ij}) \cdot x_j \quad (6)$$

When r=1, $V_{ij} \in R^{s \times 1}$ and $U_{ij} \in R^{1 \times t}$. In this case, $V_{ij}$ and $U_{ij}$ can be written as vectors $v_{ij}$ and $u_{ij}$, respectively, and:

$$V_{ij}U_{ij} = v_{ij} \otimes u_{ij}$$

The embodiments for r=1 are fully described in U.S. patent application Ser. No. 15/258,691, the contents of which are hereby incorporated by reference in their entirety.

Figure 2:
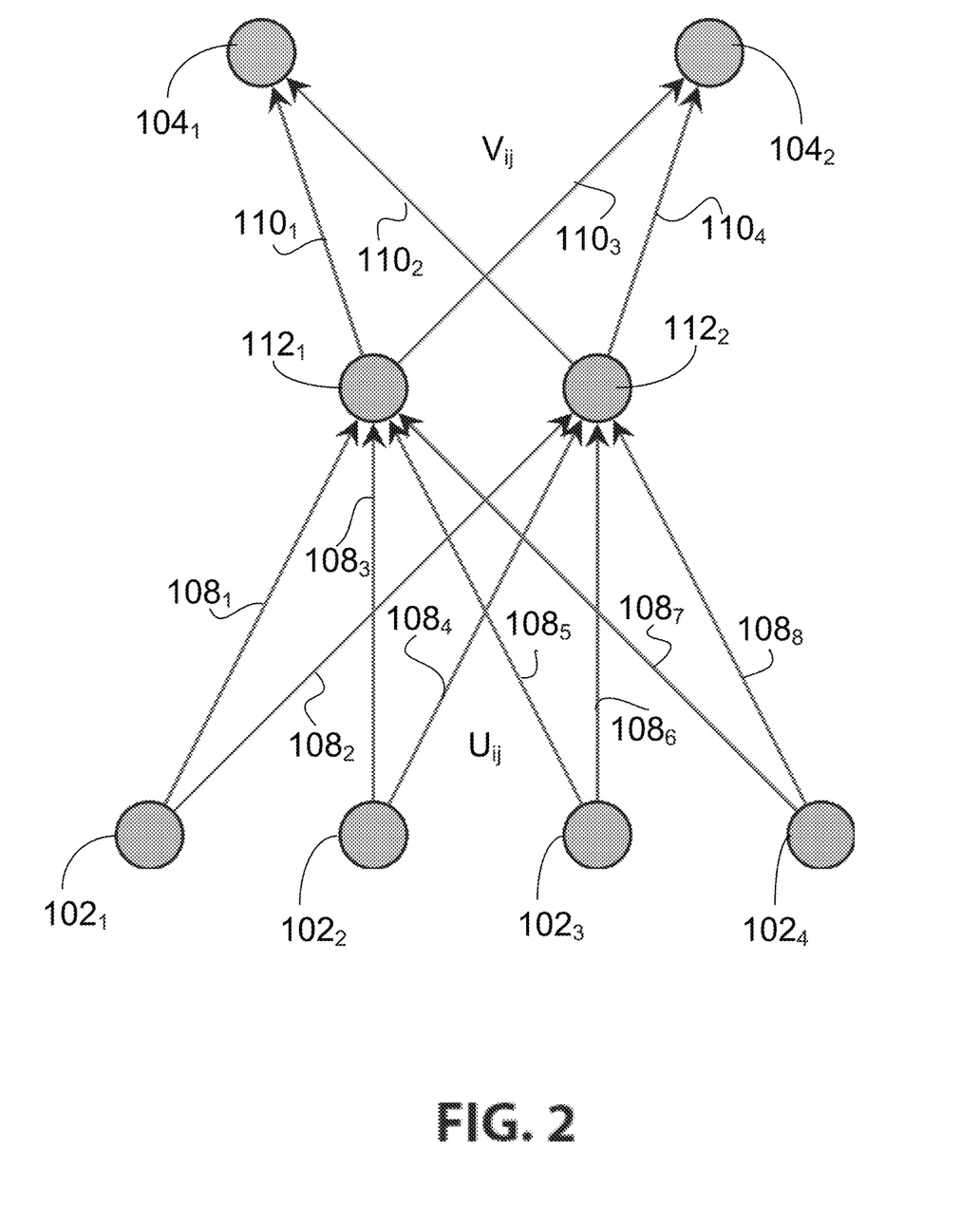
FIG. 2 is a graphical illustration of a local connection pattern between $x_j$ and $y_i$, in accordance with one embodiment.

The architecture illustrated in FIG. 2 is a local connection pattern between $x_j \in R^n$ and $y_i \in R^m$ for t=4, s=2, and r=2. It may be referred to as a tiled factorization layer and used as a drop in replacement for a fully connected layer with a comparable accuracy. The input nodes $x_j$ comprise nodes $102_1, 102_2, 102_3$, and $102_4$. The output nodes $y_i$ comprise nodes $104_1$ and $104_2$. The middle layer is formed by nodes $112_1$ and $112_2$. Each node $x_j$ is connected to nodes $112_1$ and $112_2$ via matrices $U_{ij}$, illustrated as connection lines $108_1$-$108_8$. Nodes $112_1$ and $112_2$ are each connected to nodes $104_1$ and $104_2$ via matrices $V_{ij}$ illustrated as connection lines $110_1$-$110_4$. It should be understood that the intermediate nodes $112_1, 112_2$ are not actual nodes in the neural network. They are merely a graphical representation of the intermediate step performed to compute $y_i$ when the submatrix $W_{ij}$ is represented by the product of two matrices $V_{ij}$ and $U_{ij}$, as per equations (4), (5) and (6).

Using the tiled factorization layer, the number of parameters per submatrix $W_{ij}$ is reduced from (s×t) to r(s+t). In FIG. 2, 2(2+4)=12 parameters are used to represent the (2×4=8) entries of $W_{i,j}$. Note that for small values of s and t, the number of parameters for a tiled factorization layer is greater than the number of parameters for a regular fully connected layer. However, when the values are larger, for example t=60, s=30, and r=2, the number of parameters is reduced significantly, for example from 60×30=1800 to 2(60+30)=180.

Therefore, compared to a fully connected layer the overall number of parameters needed is reduced by a factor of:

$$\frac{s \times t}{r(s+t)}$$

Figure 3A:
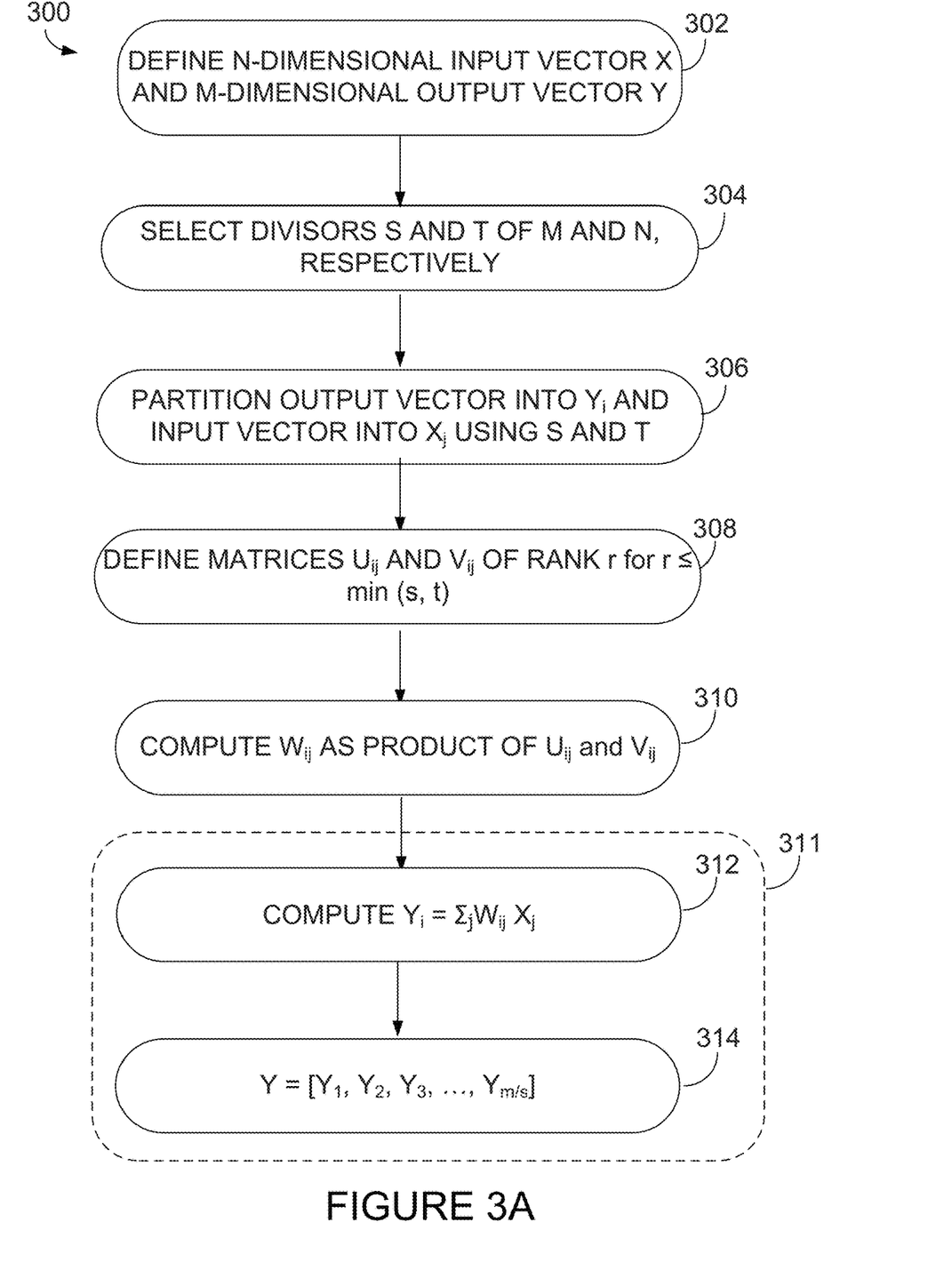
FIG. 3A is a flowchart of a method for creating a fully-connected layer for use in a neural network in accordance with a first embodiment.

Referring now to FIG. 3A, there is illustrated a method 300 for creating a layer for use in a neural network, such as but not limited to a feedforward neural network. In some embodiments, the neural network is a deep neural network. At step 302, an n-dimensional input vector and an m-dimensional output vector are defined. The input and output vectors may be of any size.

At step 304, divisors s and t of m and n, respectively, are selected. Any values which divide into m and n, respectively, may be chosen. At step 306, the input vector and the output vector are each partitioned using the divisors s and t. Specifically, the output vector y is partitioned into equally sized subvectors $y_i$ of length s, where y=[$y_1$, $y_2$, $y_3$, ..., ym/s] and the input vector x is partitioned into equally sized subvectors $x_j$ of length t, where x=[$x_1$, x, $x_3$, ..., xn/t].

At step 308, a matrix $U_{ij} \in R^{r \times t}$ of rank r and a matrix $V_{ij} \in R^{s \times r}$ of rank r are defined for each i=(1, ..., m/s) and j=(1, ..., n/t). Rank r is selected to be less than or equal to the smallest one of s and t. Note that parameters s, t, and r are user selectable and may be customized to obtain desired savings in computation, memory, and/or storage requirement for a given neural network.

At step 310, the product of $U_{ij}$ and $V_{ij}$ is computed to produce submatrices $W_{ij}$, so that $W_{ij}=V_{ij}U_{ij}$. Once the submatrices $W_{ij}$ are computed from the product of $U_{ij}$ and $V_{ij}$, the output vector y is determined from y=W·x, where W is a matrix composed of all submatrices $W_{ij}$ for i=(1, ..., m/s) and j=(1, ..., n/t), as per step 311.

An embodiment of step 311 is illustrated at steps 312 and 314. At step 312, output subvector $y_i$ is computed as the product of $W_{ij}$ and $x_j$, so that $y_i = \sum_{j=1}^{n/t}(V_{ij}U_{ij})x_j$. At step 314, all $y_i$ values are concatenated to obtain the output vector y.

Figure 3B:
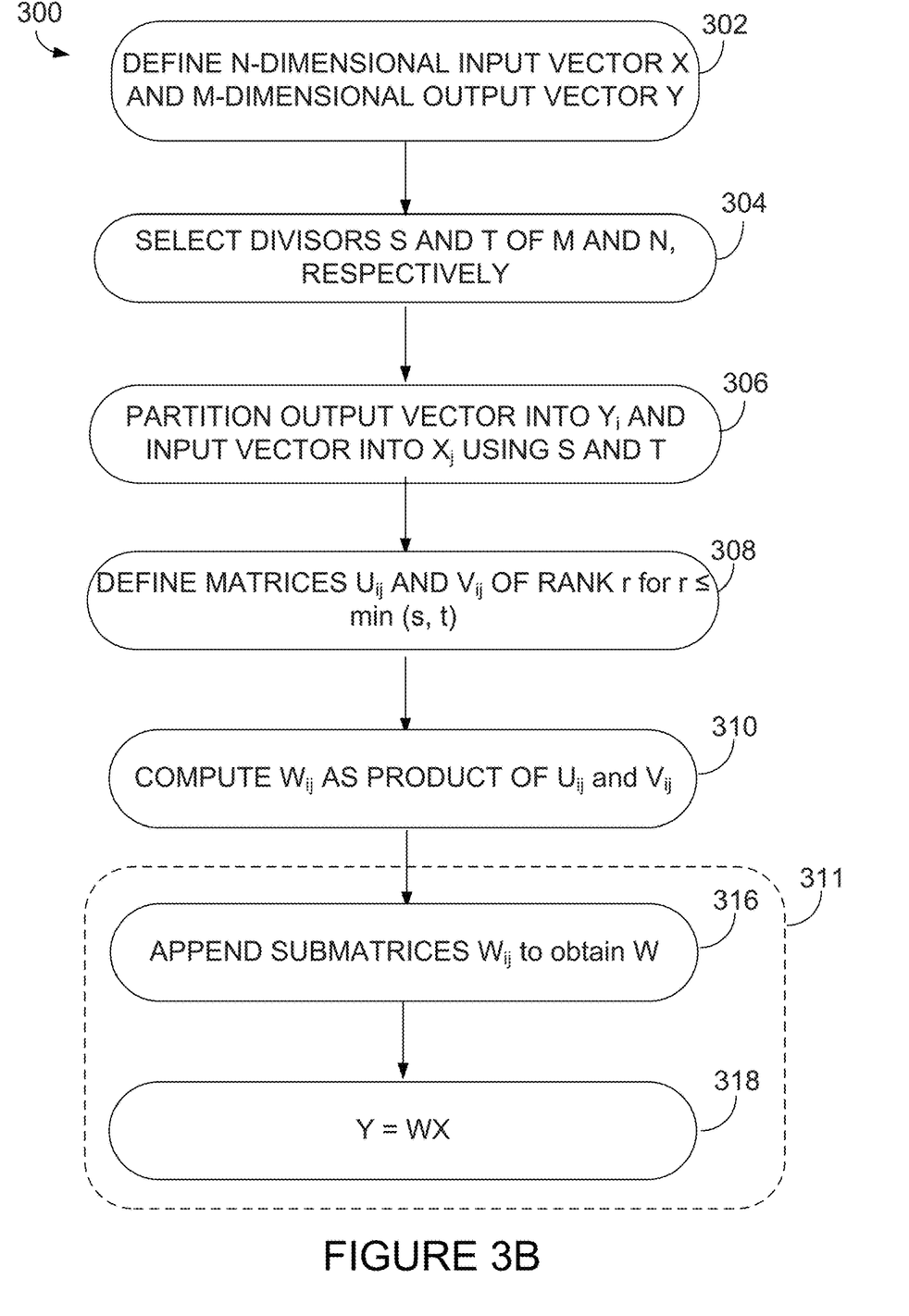
FIG. 3B is a flowchart of a method for creating a fully-connected layer for use in a neural network in accordance with a second embodiment.

An alternative embodiment of step 311 is illustrated in FIG. 3B at steps 316 and 318. At step 316, submatrices $W_{ij}$ are appended to obtain matrix W, such that:

$$W = \begin{bmatrix} W_{1,1} & W_{1,2} & \cdots & W_{1,j} & \cdots & W_{1,\frac{n}{t}} \\ W_{2,1} & W_{2,2} & \cdots & W_{2,j} & \cdots & W_{2,\frac{n}{t}} \\ \cdots & \cdots & \cdots & \cdots & \cdots & \cdots \\ W_{i,1} & W_{i,2} & \cdots & W_{i,j} & \cdots & W_{i,\frac{n}{t}} \\ \cdots & \cdots & \cdots & \cdots & \cdots & \cdots \\ W_{\frac{m}{s},1} & W_{\frac{m}{s},2} & \cdots & W_{\frac{m}{s},j} & \cdots & W_{\frac{m}{s},\frac{n}{t}} \end{bmatrix}$$

At step 318, the output vector y is obtained as the product of matrix W and input vector x: y=Wx.

In some embodiments, the method 300 comprises a step of storing matrices $V_{ij}$ and $U_{ij}$. Therefore, instead of storing each submatrix $W_{ij}$, the matrices $V_{ij}$ and $U_{ij}$ are stored, and $W_{ij}$ is computed during feed-forward using the product of $V_{ij}$ and $U_{ij}$. During training, the parameters $V_{ij}$ and $U_{ij}$ are learned.

Figure 4:
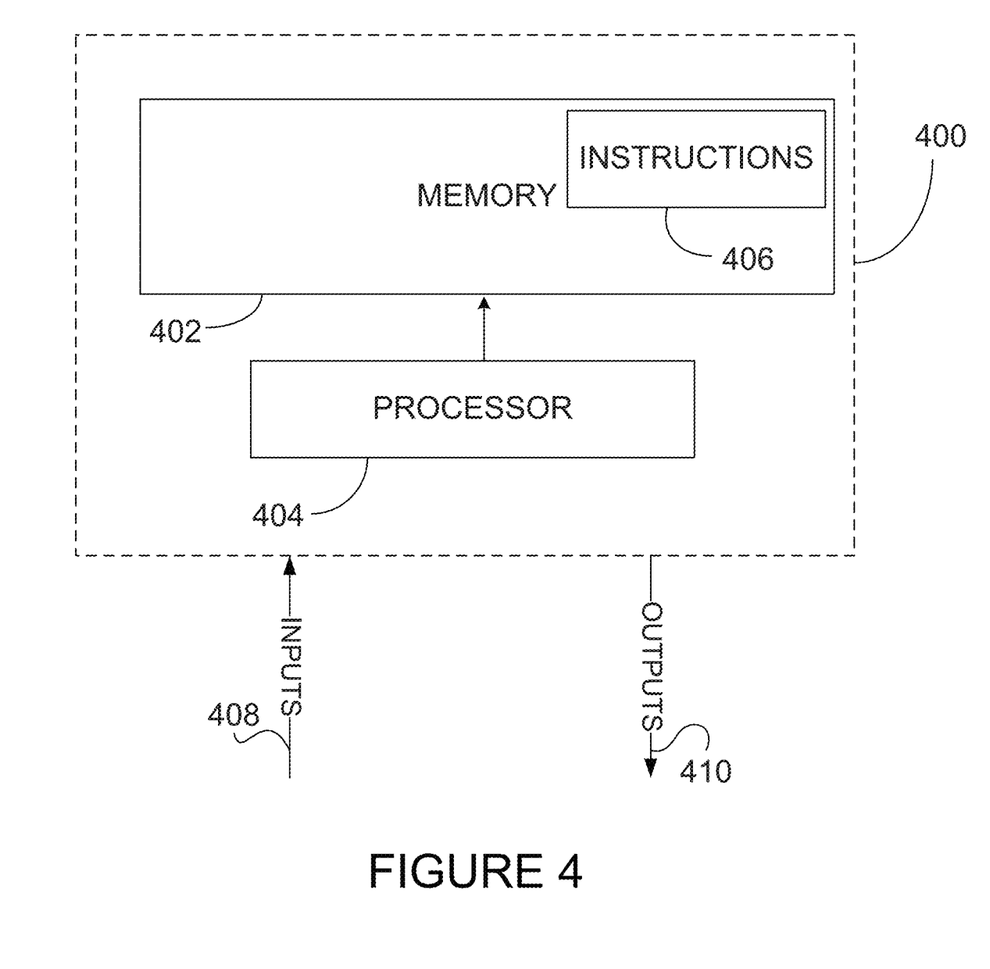
FIG. 4 is a block diagram of an example system for implementing the method of FIGS. 3A and 3B.

Referring to FIG. 4, the methods of FIGS. 3A and 3B may be implemented on one or more computing device 400. Computing device 400 may comprise one or more processor 404 and one or more computer-readable memory 402 storing machine-readable instructions 406 executable by processor 404 and configured to cause processor 404 to generate one or more outputs 410 based on one or more inputs 408. The inputs may comprise values for any one of m, n, s, t, and r. The inputs 408 may also comprise the input and/or output vectors x and y, respectively. The outputs 410 may comprise the matrices $V_{ij}$ and $U_{ij}$, the product of matrices $V_{ij}$ and $U_{ij}$, and/or the output subvectors $y_i$ as defined by equations (4) or (6). In some embodiments, the outputs 410 comprise the submatrices $W_{ij}$ after having been computed from the product of $V_{ij}$ and $U_{ij}$. Other inputs 408 and outputs 410 may also apply.

Processor 404 may comprise any suitable device(s) configured to cause a series of steps to be performed by computer 400 so as to implement a computer-implemented process such that instructions 406, when executed by computing device 400 or other programmable apparatus, may cause the functions/acts specified in the methods described herein to be executed. Processor 404 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 402 may comprise any suitable known or other machine-readable storage medium. Memory 402 may comprise non-transitory computer readable storage medium such as, but not limited to, an electronic, magnetic, optical, electromagnetic, infrared, or semiconductor system, apparatus, or device, or any suitable combination of the foregoing. Memory 402 may include a suitable combination of any type of computer memory that is located either internally or externally to computer 400 such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 402 may comprise any storage means (e.g. devices) suitable for retrievably storing machine-readable instructions 406 executable by processor 404.

Various aspects of the present disclosure may be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memory 402) having computer readable program code (e.g., instructions 406) embodied thereon. The computer program product may, for example, be executed by computer 400 to cause the execution of one or more methods disclosed herein in entirety or in part.

Computer program code for carrying out operations for aspects of the present disclosure in accordance with instructions 406 may be written in any combination of one or more programming languages, including an object oriented programming language such as Java, Smalltalk, C++ or the like and conventional procedural programming languages, such as the "C" programming language or other programming languages. Such program code may be executed entirely or in part by computer 400 or other processing device(s). It is understood that, based on the present disclosure, one skilled in the relevant arts could readily write computer program code for implementing the methods disclosed herein.

In some embodiments, computer 400 may be used to perform a method for implementing a neural network having at least one layer. An n-dimensional input vector x is received as input 408. The method comprises retrieving from memory matrix $U_{ij} \in \mathbb{R}^{r \times t}$ of rank r and matrix $V_{ij} \in \mathbb{R}^{s \times r}$ of rank r, where s is a divisor of m and t is a divisor of n for partitioning an output vector y into equally sized subvectors $y_i \in \mathbb{R}^m$ and partitioning the input vector x into equally sized subvectors $x_j \in \mathbb{R}^n$, and where $r \leq \min(s, t)$. The instructions 406 are configured to compute the product of the matrix $U_{ij}$ and the matrix $V_{ij}$ to obtain the submatrices $W_{ij} \in \mathbb{R}^{s \times t}$, and to compute output subvectors $y_i$ as $y_i = \Sigma_{j=1}^{n/t} W_{ij} \cdot x_j$. Alternatively, the instructions 406 are configured to compute the output subvectors $y_i$ as $y_i = \Sigma_{j=1}^{n/t} (V_{ij} U_{ij}) \cdot x_j$. The output subvectors $y_i$ may be provided as part of outputs 410.

Computer-executable instructions 406 may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Figure 5:
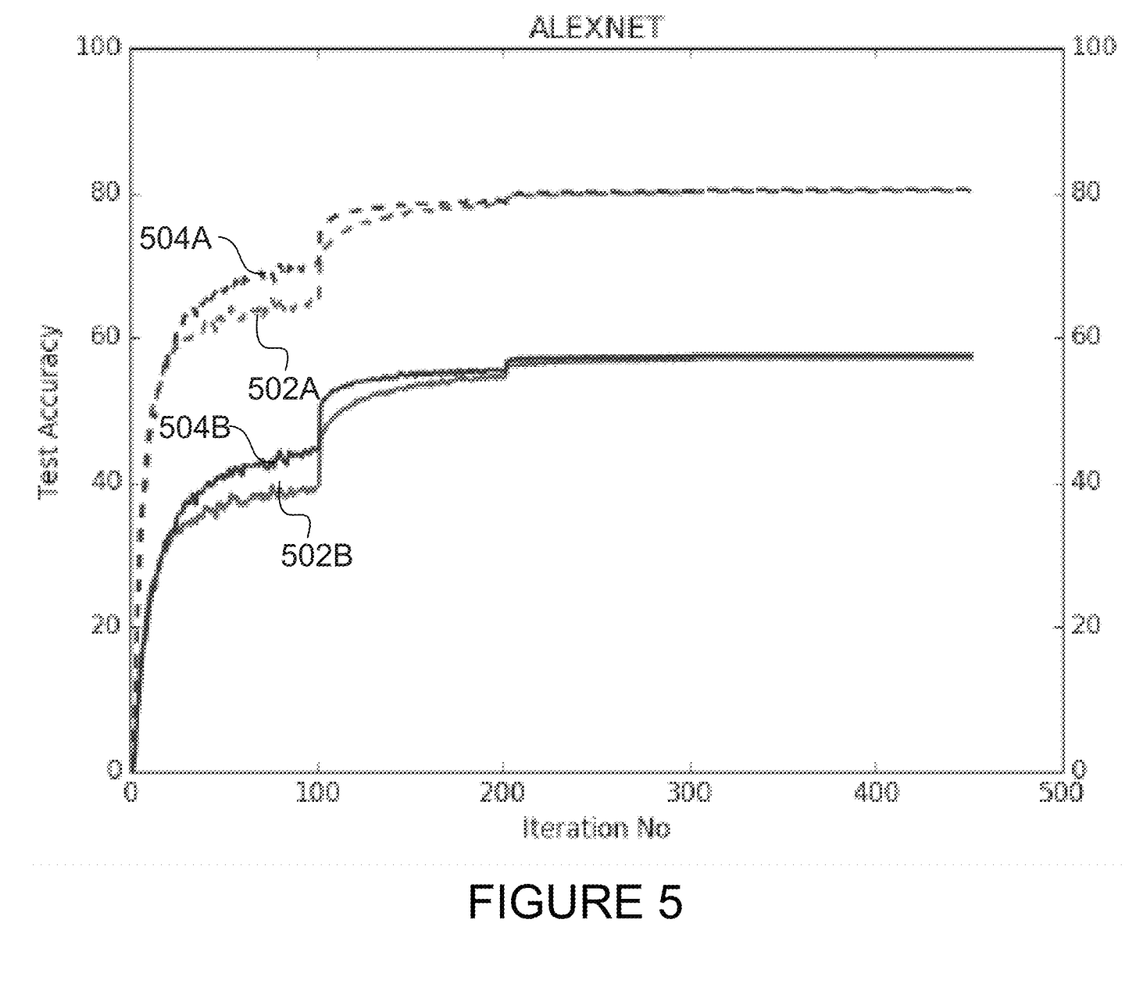
FIG. 5 is a comparative graph of the accuracy of a network having a fully connected layer compared to the same network having the fully connected layer replaced by a tiled factorization layer of rank r.

Referring to FIG. 5, there is illustrated a graph comparing the accuracy obtained with a neural network containing a fully connected layer 502A, 502B to the accuracy obtained with the same network with the fully connected layer replaced with a tiled factorization layer 504A, 504B. Note that curves 502A, 504A are TOP-5 accuracies and curves 502B, 504B are TOP-1 accuracies. In the calculation of TOP-5 accuracy, the top 5 predictions of the neural network are checked against the correct answer. If one of these 5 predictions is the correct answer then that is considered as a correct prediction. In the calculation of TOP-1 accuracy, only the top prediction of the network is checked against the correct answer.

The neural network used in the simulation of FIG. 5 contains a tiled factorization layer with n=9216, m=4096, s=64, t=36, and r=2. As shown, the accuracy is substantially similar for the fully connected layer and the tiled factorization layer, and the network with the tiled factorization layer uses less parameters, thus leading to a savings in memory space. The savings are proportional to $(s*t)/(r(s+t))$.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The appended claims are to encompass within their scope all such changes and modifications.

The invention claimed is:

1. A computer-implemented method for computing an output of a fully connected layer of a neural network, the fully connected layer comprising n inputs and m outputs, and m×n connection parameters, the computer-implemented method comprising:
   receiving a n-dimensional input vector x representative of the n inputs of the fully connected layer and a m-dimensional output vector y representative of the m outputs of the fully connected layer;
   partitioning the m-dimensional output vector y into equally sized subvectors $y_i$, of length s and the n-dimensional input vector x into equally sized subvectors $x_j$ of length t, wherein s is a divisor of m and t is a divisor of n;
   generating matrices $U_{ij} \in \mathbb{R}^{r \times t}$ of rank r and matrices $V_{ij} \in \mathbb{R}^{s \times r}$ of rank r for i=(1, . . . , m/s) and j=(1, . . . , n/t), where r is a positive integer and $r \leq \min(s, t)$, each of the matrices $U_{ij}$ comprising r×t connection parameters associated with logical connections between the n inputs and (m/s)*r*(n/t) logical intermediate nodes connected between the n inputs and the m outputs, and each of matrices $V_{ij}$ comprising r×s connection parameters associated with logical connections between the (m/s)*r*(n/t) logical intermediate nodes and the m outputs;
   computing subvectors $y_i = \Sigma_{j=1}^{n/t} V_{ij}(U_{ij} x_j)$ for i=(1, . . . , m/s) to reduce a number of multiplications by a factor of s×t/r(s+t); and
   computing the output vector y as the output of the fully connected layer of the neural network, the output vector y computed by appending all the subvectors $y_i$.

2. The method of claim 1, further comprising storing the matrices $V_{ij}$ and $U_{ij}$.

3. The method of claim 2, further comprising retrieving the stored matrices $V_{ij}$ and $U_{ij}$ to compute the subvectors $y_i$.

4. The method of claim 1, wherein the neural network is a feedforward neural network.

5. The method of claim 1, wherein the neural network is a deep neural network.

6. The method of claim 1, wherein the r×s connection parameters of each of the matrices $V_{ij}$ and the r×t connection parameter of each of the matrices $U_{ij}$ are learned during a training phase of the neural network.

7. A system for computing an output of a fully connected layer of a neural network, the fully connected layer comprising n inputs and m outputs the system comprising:
   a processing unit; and
   a non-transitory memory communicatively coupled to the processing unit and comprising computer-readable program instructions executable by the processing unit for:
   receiving a n-dimensional input vector x representative of the n inputs of the fully connected layer and a m-dimensional output vector y representative of the m outputs of the fully connected layer;
   partitioning the m-dimensional output vector y into equally sized subvectors $y_i$, of length s and the n-dimensional input vector x into equally sized subvectors $x_j$ of length t, wherein s is a divisor of m and t is a divisor of n;
   generating matrices $U_{ij} \in \mathbb{R}^{r \times t}$ of rank r and matrices $V_{ij} \in \mathbb{R}^{s \times r}$ of rank r for i=(1, . . . , m/s) and j=(1 . . . , n/t), where r is a positive integer and r≤min(s, t) each of the matrices $U_{ij}$ comprising r×t connection parameters associated with logical connections between the n inputs and (m/s)*r*(n/t) logical intermediate nodes between the n inputs and the m outputs, and each of matrices $V_{ij}$ comprising the r×s connection parameters associated with logical connections between the (m/s)*r*(n/t) logical intermediate nodes and the m outputs;

computing subvectors $y_i = \Sigma_{j=1}^{n/t} V_{ij}(U_{ij}x_{ij})$ for i=(1, . . . , m/s) to reduce a number of multiplications by a factor of s×t/r(s+t); and computing the output vector y as the output of the fully connected layer of the neural network, the output vector computed by appending all the subvectors $y_i$.

8. The system of claim 7, wherein the r×s connection parameters of each of the matrices $V_{ij}$ and the r×t connection parameter of each of the matrices $U_{ij}$ are learned during a training phase of the neural network.

9. A computer-implemented method for computing an m-dimensional output vector y representative of m outputs of a fully connected layer of a neural network, the method comprising:

receiving an n-dimensional input vector x representative of n inputs of the fully connected layer of the neural network;

retrieving from memory matrices $U_{ij} \in R^{r \times t}$ of rank r and matrices $V_{ij} \in R^{s \times r}$ of rank r, each of the matrices $U_{ij}$ comprising r×t connection parameters associated with logical connections between the n inputs and (m/s)*r*(n/t) logical intermediate nodes between the n inputs and m outputs, and each of the matrices $V_{ij}$ comprising r×s connection parameters associated with logical connections between the (m/s)*r*(n/t) logical intermediate nodes and the m outputs, wherein s is a divisor of m and t is a divisor of n, r is a positive integer and r≤min(s, t);

partitioning the input vector x into equally sized subvectors $x_j$ of length t;

computing submatrices $W_{ij}$ as a product of matrices $U_{ij}$ and matrices $V_{ij}$ wherein a total number of connection parameters included in each submatrix $W_{ij}$ is r*(s+t); and computing the m-dimensional output vector y from y=W·x as the output of the fully connected layer of the neural network, where W is a matrix composed of all submatrices $W_{ij}$ for i=(1, . . . , m/s) and j=(1, . . . , n/t).

10. The method of claim 9, wherein determining the output vector y from y=W·x comprises:

computing $y_i = \Sigma_{j=1}^{n/t}(W_{ij}x_j)$; and computing the output vector y as y=[$y_1, y_2, y_3, \ldots, y_{m/s}$].

11. The method of claim 9, wherein determining the output vector y from y=W·x comprises:

appending submatrices $W_{ij}$ to obtain matrix W; and computing y=W·x.

12. The method of claim 9, wherein the neural network is a feedforward neural network.

13. The method of claim 9, wherein the neural network is deep neural network.

14. A computing system for computing an m-dimensional output vector y representative of m outputs of a fully connected layer of a neural network, the computing system comprising:

a processing unit; and a non-transitory memory communicatively coupled to the processing unit and comprising computer-readable program instructions executable by the processing unit for:

receiving an n-dimensional input vector x representative of n inputs of the fully connected layer of the neural network;

retrieving from memory matrices $U_{ij} \in R^{r \times t}$ of rank r and matrices $V_{ij} \in R^{s \times r}$ of rank r, each of the matrices $U_{ij}$ comprising r×t connection parameters associated with logical connections between the n inputs and (m/s)*r*(n/t) logical intermediate nodes between the n inputs and m outputs, and each of the matrices $V_{ij}$ comprising r×s connection parameters associated with logical connections between the (m/s)*r*(n/t) logical intermediate nodes and the m outputs, wherein s is a divisor of m and t is a divisor of n, r is a positive integer and r≤min(s, t);

partitioning the input vector x into equally sized subvectors $x_j$ of length t;

computing submatrices $W_{ij}$ as a product of matrices $U_{ij}$ and matrices $V_{ij}$ wherein a total number of connection parameters included in each submatrix $W_{ij}$ is r*(s+t); and computing the m-dimensional output vector y from y=W·x, where W is a matrix composed of all submatrices $W_{ij}$ for i=(1, . . . , m/s) and j=(1, . . . , n/t).

15. The computing system of claim 14, wherein determining the output vector y from y=W·x comprises:

computing $y_i = \Sigma_{j=1}^{n/t}(W_{ij}x_j)$; and computing the output vector y as y=[$y_1, y_2, y_3, \ldots, y_{m/s}$].

16. The computing system of claim 14, wherein determining the output vector y from y=W·x comprises:

appending submatrices $W_{ij}$ to obtain matrix W; and computing y=W·x.

17. The computing system of claim 14, wherein the neural network is a feedforward neural network.

18. The computing system of claim 14, wherein the neural network is a deep neural network.

* * * * *

UNITED STATES PATENT AND TRADEMARK OFFICE
CERTIFICATE OF CORRECTION

PATENT NO. : 10,896,366 B2
APPLICATION NO. : 15/453641
DATED : January 19, 2021
INVENTOR(S) : Sozubek et al.

It is certified that error appears in the above-identified patent and that said Letters Patent is hereby corrected as shown below:

In the Claims

In Column 9, Lines 27-28, Claim 9, delete "retrieving from memory matrices $U_{ij}$ ε $R^{rxt}$ of rank $r$ and matrices $V_{ij}$ ε $R^{sxr}$ of rank $r$" and insert --retrieving from memory matrices $U_{ij}$ ϵ $R^{rxt}$ of rank $r$ and matrices $V_{ij}$ ϵ $R^{sxr}$ of rank $r$--.

In Column 10, Lines 20-21, Claim 14, delete "retrieving from memory matrices $U_{ij}$ ε $R^{rxt}$ of rank $r$ and matrices $V_{ij}$ ε $R^{sxr}$ of rank $r$" and insert --retrieving from memory matrices $U_{ij}$ ϵ $R^{rxt}$ of rank $r$ and matrices $V_{ij}$ ϵ $R^{sxr}$ of rank $r$--.

In Column 10, Line 29, Claim 14, delete "r is a positive integer".

In Column 10, Lines 32-33, Claim 14, delete "matrices $U_{ij}$ and matrices $V_{ij}$" and insert --the matrix $U_{ij}$ and the matrix $V_{ij}$--.

Signed and Sealed this
Fourth Day of May, 2021

Drew Hirshfeld
*Performing the Functions and Duties of the
Under Secretary of Commerce for Intellectual Property and
Director of the United States Patent and Trademark Office*